March 10, 1925. 1,529,223
E. A. STOLL
APPARATUS FOR THE HANDLING AND TRANSPORTATION BY STEAM AND ELECTRIC RAILWAYS AND OTHER COMMON CARRIERS, OF VARIOUS CLASSES OF FREIGHT
Filed July 7, 1921 2 Sheets-Sheet 1
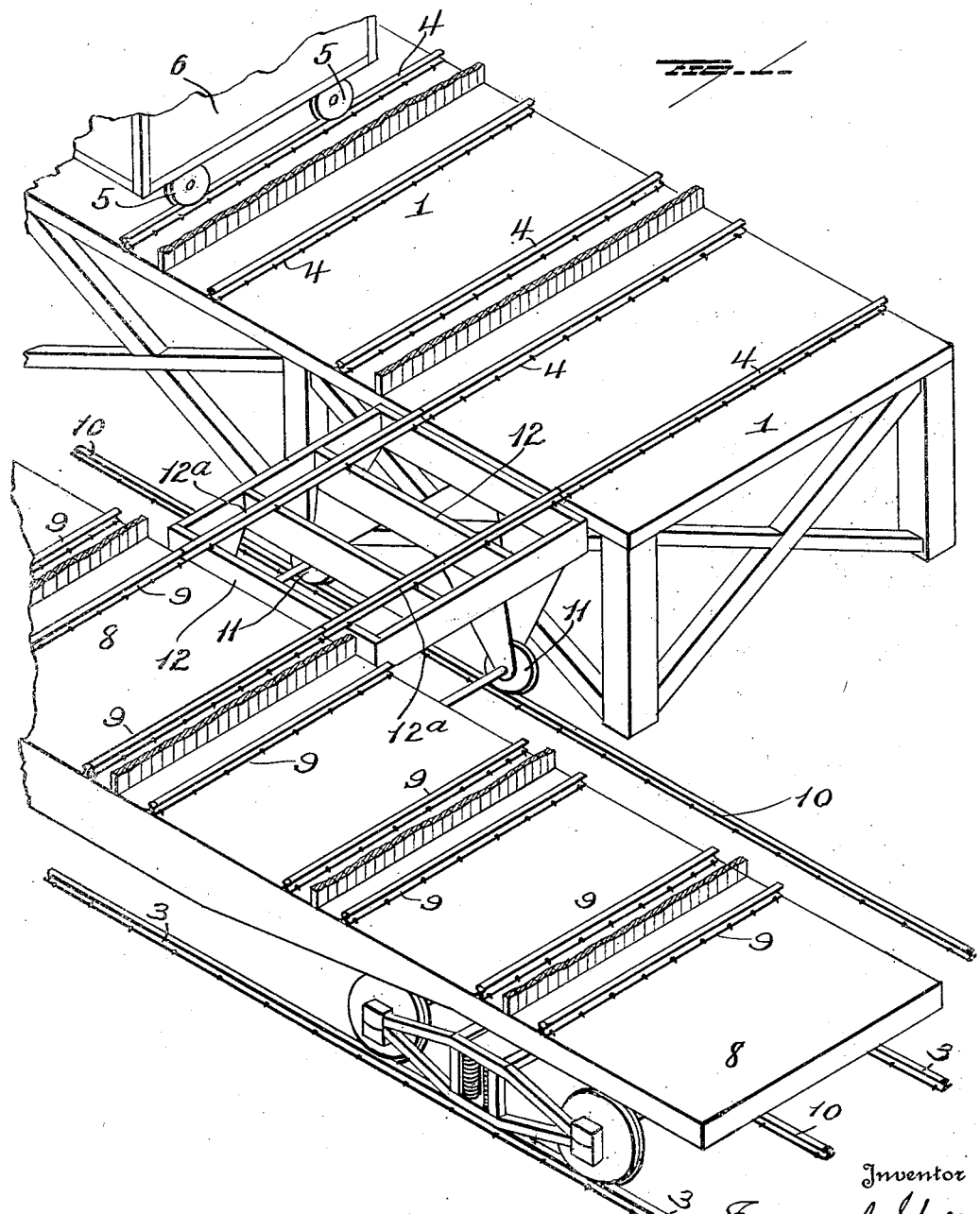
Inventor
Edgar A. Stoll
By Seymour & Bright
Attorneys March 10, 1925.  1,529,223
E. A. STOLL
APPARATUS FOR THE HANDLING AND TRANSPORTATION BY STEAM AND ELECTRIC RAILWAYS,
AND OTHER COMMON CARRIERS, OF VARIOUS CLASSES OF FREIGHT
Filed July 7, 1921  2 Sheets-Sheet 2
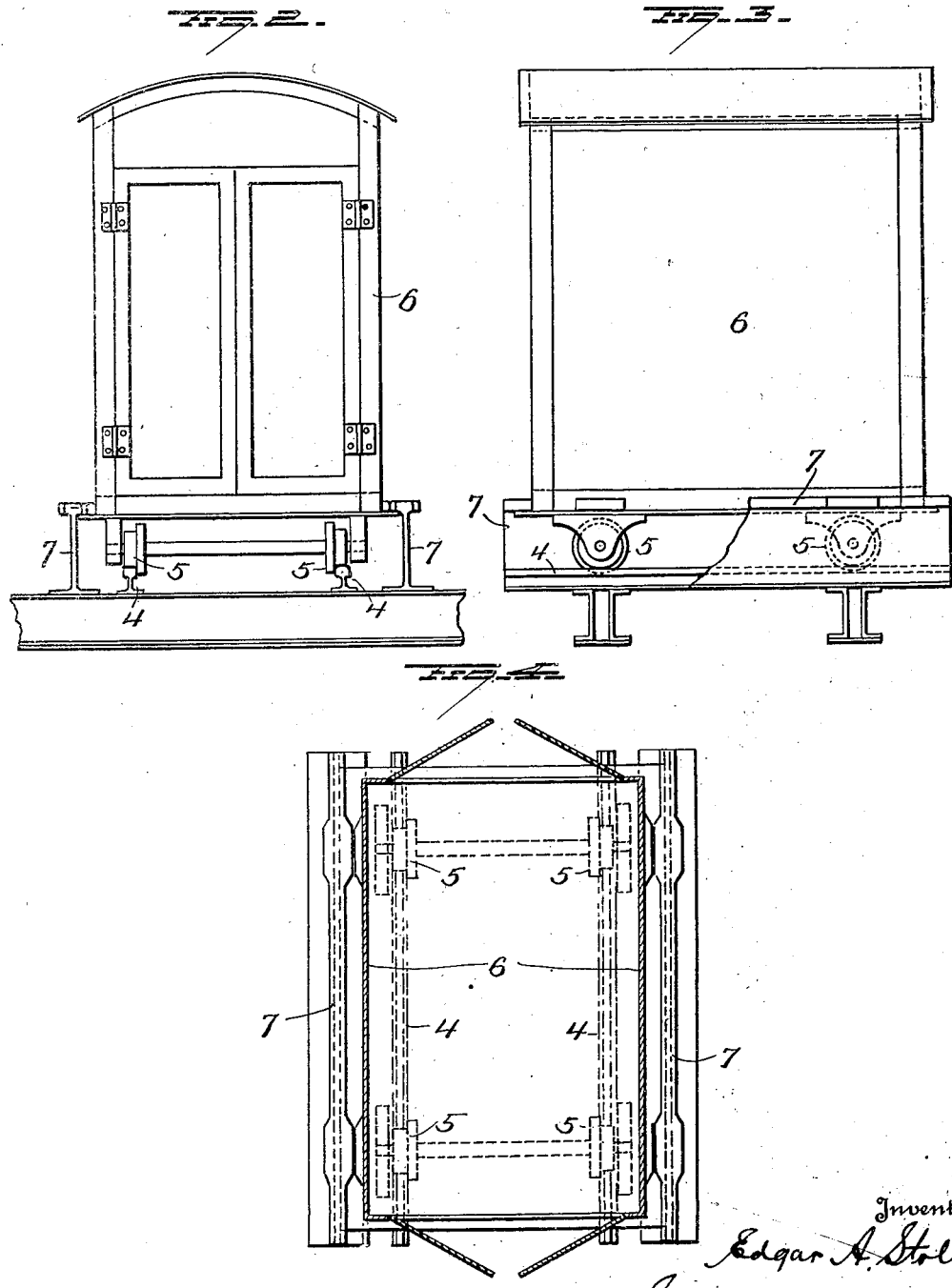

Patented Mar. 10, 1925.

1,529,223

UNITED STATES PATENT OFFICE.

EDGAR A. STOLL, OF SOUTH BEND, INDIANA.

APPARATUS FOR THE HANDLING AND TRANSPORTATION BY STEAM AND ELECTRIC RAILWAYS AND OTHER COMMON CARRIERS OF VARIOUS CLASSES OF FREIGHT.

Application filed July 7, 1921. Serial No. 483,077.

*To all whom it may concern:*

Be it known that I, EDGAR A. STOLL, a citizen of the United States, residing at the city of South Bend, county of St. Joseph, State of Indiana, have invented a new and useful Improvement in apparatus for the handling and transportation by steam and electric railways and other common carriers of various classes of freight, such as perishable goods, merchandise, and products of various nature; also express matter and Government mails.

This invention relates to improvements in freight handling and transportation systems,—one object of the invention being to provide simple and efficient means to facilitate the economical handling of freight in the loading of the same on cars or the unloading of the freight from cars,—the apparatus being such as to insure safety to the freight and so that the expense incident to the loading or unloading of the freight shall be reduced to a minimum.

With this and other objects in view, the invention consists in certain novel features and combinations of parts as hereinafter set forth and pointed out in the claims.

In the accompanying drawings;

Figure 1 is a view in perspective illustrating an embodiment of my invention;

Figure 2 is an end view showing the portable freight container;

Figure 3 is a side view and Figure 4 a plan view of the structure shown in Figure 2.

My improvements contemplate means for loading freight from a platform to cars or from cars to a platform in a manner to effectually protect the parcels of freight from injury and also to facilitate the rapidity with which the freight may be safely handled.

In the embodiment of the invention shown in the drawings, I employ a receiving platform 1 which may be suitably supported by framework 2 a short distance from the rails of a railroad track 3.

The platform 1 has suitably located thereon, a plurality of rails forming trackways 4 disposed transversely of said platform, for the accommodation of the wheels 5 of portable containers such as indicated at 6 in which the freight to be handled will be housed. The wheels 5 may be flanged and the peripheral tread portions of said wheels as well as the peripheral portions of their flanges will preferably be made with comparatively broad faces parallel with the axes of said wheels. At respective sides of each transverse trackway, guides 7 for the freight containers may be located on the platform 1, as shown in Figure 2.

A freight car or truck 8 is provided to run on the railroad track 3 and has arranged transversely thereon a plurality of pairs of rails forming trackways 9 for the accommodation of the wheels 5 of the containers 6, and said containers may be secured in position on the trackways of the railway car or truck 8, during transit, by any suitable fastening devices.

Interposed between the railway track 3 and the platform structure 1 are the rails of a trackway 10 on which the wheels 11 of a transfer truck 12 are adapted to run, the arrangement being such that the transfer truck will span the space between the railway car or truck 8 and the platform and the rails of a track 12ᵃ on said transfer truck caused to align with any one of the trackways 4 on the platform 1 and any one on the tracks 9 on the railroad truck 8.

With the use of my improvements, the freight to be handled may be properly packed in portable containers, such as indicated at 6 and these may be easily and safely loaded from the platform 1 onto the railroad truck, through the medium of the portable transfer truck 12, or said containers may be similarly unloaded from the car or truck 8 to the platform 1. It is evident that containers 6 may be transferred from various portions of the platform 1 to the car or truck 8 at any desired position on the latter, or may be transferred from the truck 8 to any desired part of the platform 1.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a system of the character described, the combination with a platform and a car, of a portable container, and a transfer device movable alongside and between said car and platform, whereby said container can be run over said transfer device from the platform to the car and vice versa.

2. In a system of the character described, the combination with a freight platform and a freight car, each having transverse trackways, of a portable freight container, and a movable transfer device adapted to be disposed between the car and platform to facilitate the transfer of said container from the platform to the car and vice versa.

3. In a system of the character described, the combination with a railroad track, of a platform adjacent thereto and provided with a plurality of trackways, a railway car provided with a plurality of transverse trackways, an intermediate trackway between the railroad trackway and the platform, a transfer truck mounted to run on said intermediate trackway, a transverse trackway on said transfer truck to be made to align with any transverse trackway on the platform and any transverse trackway on the railroad car, and a wheeled freight container to be mounted on any of the transverse trackways on the platform or railroad car and to be transferred from one to the other over the trackway on the transfer truck.

4. The combination with a platform and a railroad track, of a plurality of transverse trackways on the platform, wheeled freight containers to be mounted on said transverse trackways, guide rails at respective sides of each of said transverse trackways and cooperable with a freight container thereon, a railroad car on the railroad track, a plurality of transverse tracks on said car, and a portable truck between the railroad track and said platform and provided with a transverse trackway to align with trackways on the platform and car.

In testimony whereof I hereunto affix my signature, in the presence of two witnesses, this 29th day of July, 1922.

EDGAR A. STOLL.

Witnesses:
F. D. HAGER,
GEO. SANDS.